July 23, 1929.  J. W. EISIMINGER ET AL  1,721,807
SPRING MOTOR
Filed Oct. 5, 1926  2 Sheets-Sheet 1

J. W. Eisiminger
C. H. Roberts
Inventors

By C. A. Snow & Co.
Attorneys

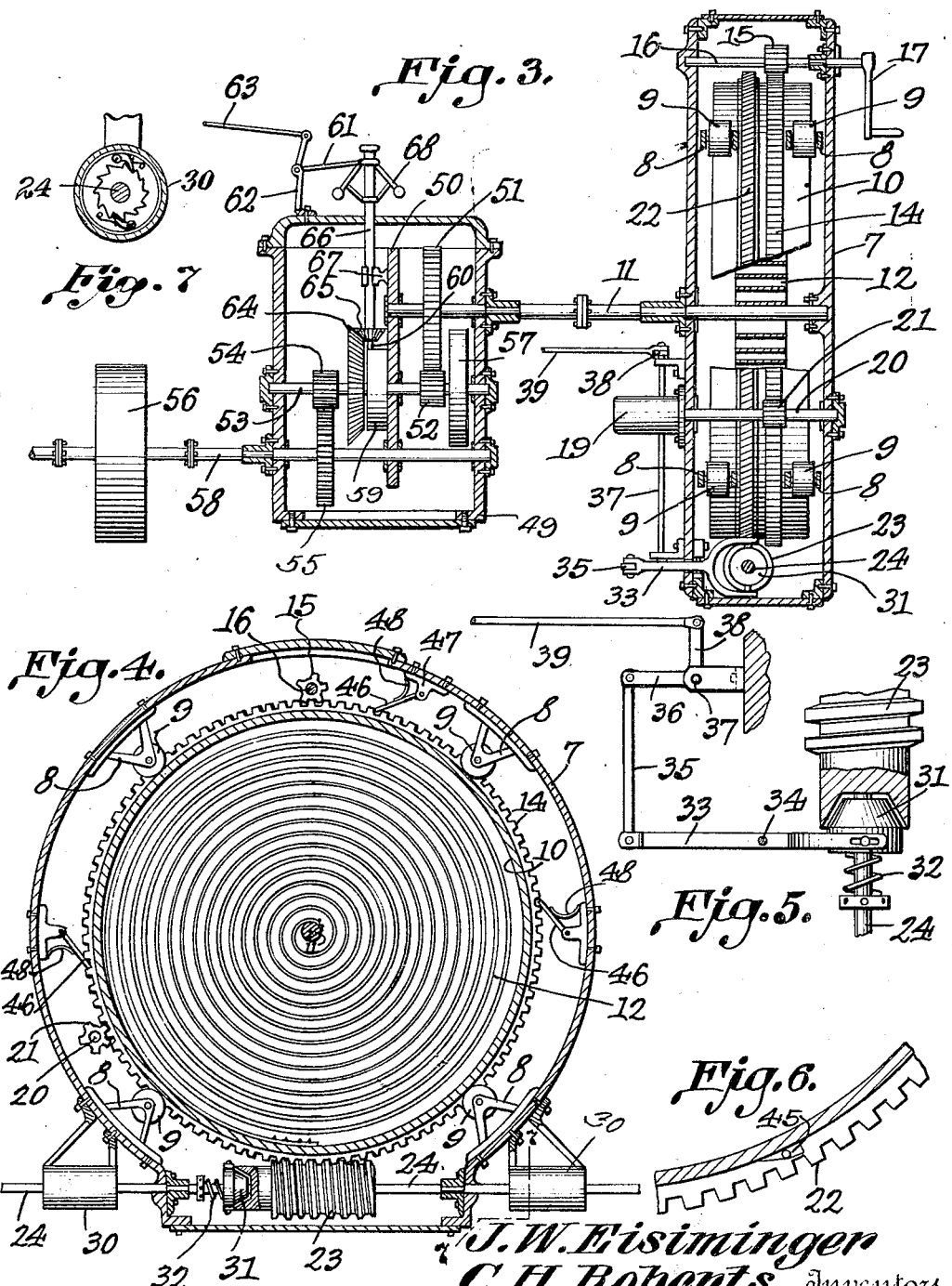

Patented July 23, 1929.

1,721,807

UNITED STATES PATENT OFFICE.

JOHN W. EISIMINGER AND CHARLES H. ROBERTS, OF OKLAHOMA CITY, OKLAHOMA.

SPRING MOTOR.

Application filed October 5, 1926. Serial No. 139,704.

This invention aims to provide a novel means whereby a motor-propelled vehicle may be driven through the instrumentality of a spring motor.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the drawings:—

Figure 3 is a vertical section taken through the driving mechanism;

Figure 4 is a transverse sectional view showing the spring barrel and attendant parts;

Figure 5 is a plan disclosing a part of the clutch mechanism, parts being in section;

Figure 6 is a sectional view disclosing a part of the spring barrel;

Figure 7 is a section taken on the line 7—7 of the Figure 4.

Figure 1:
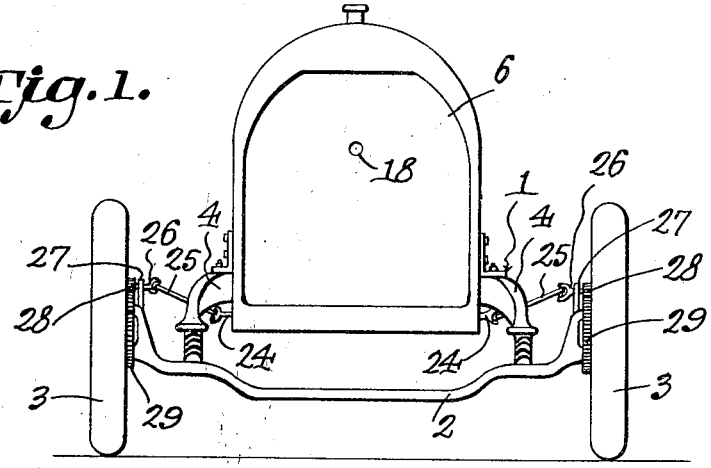
Figure 1 shows in front elevation, a motor-propelled vehicle constructed in accordance with the invention.

The operation of the machine naturally falls into parts, to wit, the winding up of the spring to store energy, and a delivery of the power from the spring to the machinery to be driven. In the description, the operations specified will be considered in the order above set forth. The numeral 1 marks a motor vehicle having a front axle 2, the front wheels being shown at 3. The numeral 4 marks the frame of the vehicle, and the hood is shown at 5. For the sake of appearances, a dummy radiator 6 is located at the forward end of the hood 5.

A support 7, in the form of a casing, is mounted on the frame 4 and is located beneath the hood 5, to the rear of the dummy radiator 6. The casing 7 has internal brackets 8 whereon wheels 9 are journaled, the wheels 9 carrying a spring barrel 10, and it being possible to rotate the spring barrel 10 on the wheels 9, in order to wind up a torsion spring 12 located within the barrel 10, the outer end of the spring 12 being connected to the spring barrel 10, and the inner end of the spring 12 being connected to a shaft 11 which is journaled for rotation in the support or casing 7.

Three mechanisms are provided for rotating the spring barrel 10, thereby to wind up the spring 12. Two of the mechanisms cooperate with an external gear 14 on the spring barrel 10.

The spring barrel 10 may be rotated by hand to wind up the spring 12, and, with this end in view, a pinion 15 meshes with the gear 14, the pinion 15 being secured to a shaft 16 that is journaled in the upper part of the support 7, it being possible to rotate the shaft 16 by means of a hand crank 17 which may be inserted through a hole 18 in the dummy radiator 6. The crank 17 may be used to rotate the shaft 16, rotation being imparted to the spring barrel 10 by way of the pinion 15 and the gear 14.

If the electrical energy is inexpensive and available, the barrel 10 may be rotated electrically to wind up the spring 12. With this end in view, a shaft 20 is mounted to rotate in the support 7, the shaft 20 having a pinion 21 which meshes with the gear 14 on the spring barrel 10. An electrical motor 19 is carried by the rear portion of the support or casing 7 and drives the shaft 20.

A third means is provided whereby the spring barrel 10 may be rotated to wind up the spring 12, and this means is operated by the wheels 3 of the vehicle. This includes a worm gear 22 meshing with a worm 23, the worm gear 22 being connected to the spring barrel 10 by one or more simple roller clutches 45, of the sort shown in Fig. 6. The clutch mechanism 45 couples the worm gear 22 to the barrel 10 when rotation is imparted to the gear 22 by the worm 23; but when the worm gear 22 and the barrel 10 are rotated by the pinion 21 or the pinion 15, the clutch 45 permits the barrel 10 to turn in the gear 22, the gear then being held by the worm 23. The worm 23 is rotatable on a shaft 24 which, in its turn, is mounted to rotate in the lower part of the support or casing 7. Universal joints 25 connect the ends of the shaft 24 with shafts 26 supported for rotation in bearings 27 on the front axle 2, the outer ends of the shafts 26 carrying pinions 28 which mesh with gear wheels 29 connected to the ground wheels 3 to rotate therewith. Ratchet mechanisms 30 are located in the shaft 24 and are carried by the casing 7. The ratchet mechanism 30, shown conventionally in the drawings, are so constructed that when the ground wheels 3 rotate forwardly, they will rotate the shaft 24, whereas, when the ground wheels 3 rotate backwardly, they will not rotate the shaft 24.

The worm 23 is coupled to the shaft 24 by means of a clutch 31 held in engagement with the worm 23 by a spring 32. A lever 33 is fulcrumed intermediate its ends, as at 34, upon the casing 7. The forward end of the lever 33 is connected in the usual way to the clutch 31. The rear end of the lever 33 is pivoted to a link 35 which is pivoted to an arm 36 on the lower end of a shaft 37, the shaft being supported for rotation on the casing 7. There is an arm 38 on the upper end of the shaft 37. The forward end of a link 39 is pivoted to the arm 38. The rear end of the link 39 is pivoted to an arm 40 on a pedal 41 mounted to swing on the foot board 42 of the vehicle, or elsewhere, the pedal being supplied with a keeper 43 adapted to be engaged by a latch 44 on the foot board. The gear 14 on the spring barrel 10 is engaged by back stop pawls 46 pivoted to brackets 47 on the support 7, the back stop pawls 46 being maintained in engagement with the gear 14 by means of springs 48 connected at their outer ends to the support 7, and bearing at their inner ends on the back stop pawls 46, as shown in Figure 4. The function of the back stop pawls 46 is to prevent retrograde rotation of the spring barrel 10, the barrel thus being held fixed, so that the spring 12 may react and rotate the shaft 11.

Figure 2:
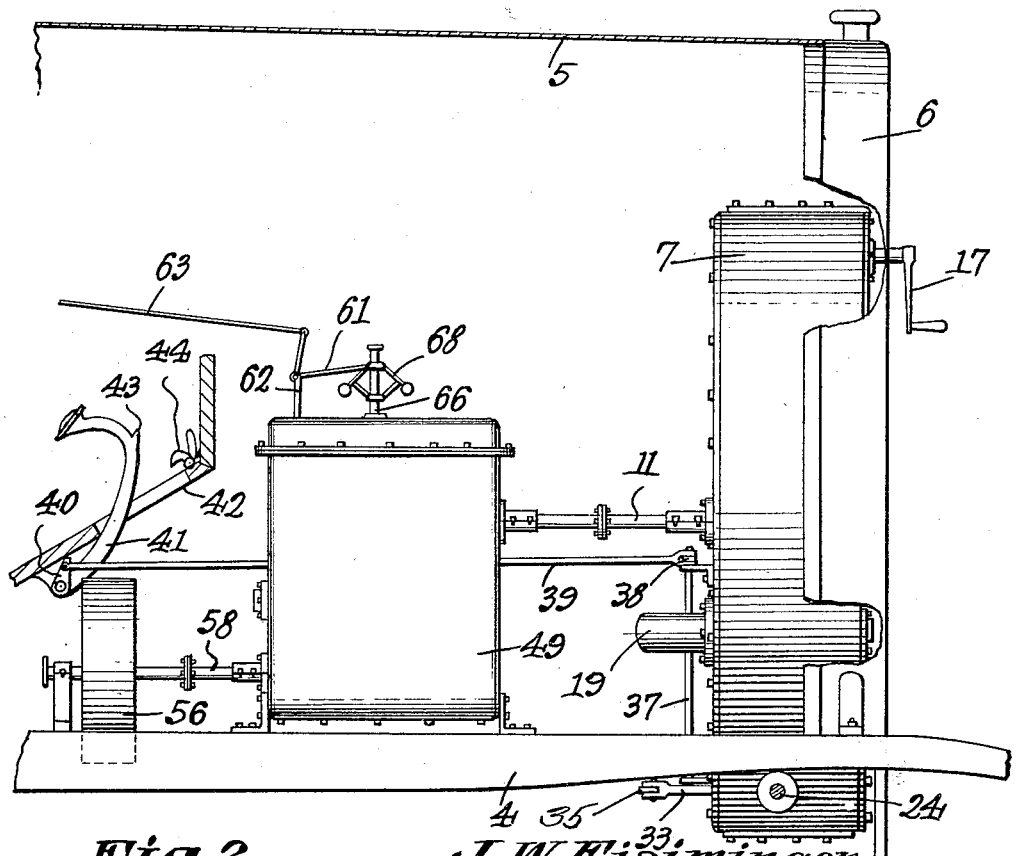
Figure 2 is a side elevation wherein parts are broken away.

Under ordinary working conditions, the pedal 41 is swung forward from the position of Figure 2 and the keeper 43 is engaged with the latch 44. A link 39, by way of the arm 38, rocks the shaft 37, and the arm 36, cooperating with the link 35, tilts the lever 33 on its fulcrum 34 and withdraws the clutch 31 from engagement with the worm 23, the spring 32 being compressed. Under the circumstances above outlined, the worm 23 is loose from the shaft 24, and the shaft 24 can rotate without rotating the worm 23 and imparting rotation to the spring drum or barrel 10. This is desirable because if the ground wheels 3 operated continuously to rotate the spring barrel 10, the machine would be inoperative. As the vehicle is moving along on the level, or is running up hill, the clutch 31 is not connected to the worm 23 but, when the vehicle starts to coast down grade, the operator can kick the latch 44 out of engagement with the keeper 43 on the pedal 41, thereby releasing the pedal 41 to the action of the spring 32. The spring 32 then moves the clutch 31 into engagement with the worm 23, the worm 23 being coupled to the shaft 24. Now there is established a driving train including the ground wheels 3, the gears 29, the pinions 28, the shafts 26, the universal joints 25, and the shaft 24, the shaft 24 operating the worm 23, and the worm 23 rotating the spring barrel 10 to wind up the spring barrel. As soon as the vehicle approaches the foot of the hill down which the vehicle is coasting, the operator tilts the pedal 41 and engages the keeper 43 automatically with the latch 44, the pedal 41 being held against movement, the link 39, the arm 38, the shaft 37, the arm 36, the link 35, and the lever 43, cooperating to disengage the clutch 31 from the worm 23, the worm 23 thus being uncoupled from the shaft 24.

The three mechanisms whereby the spring 12 is wound up, have been described, both as to structure and as to operation. The description now will proceed as an explanation of the means whereby, when the shaft 11 is rotated by the spring 12, the power is transmitted to the place of use, under the control of an operator.

A support or housing 49 is located to the rear of the casing 7 and is mounted on the frame 4 of the vehicle. The housing 49 has a bearing partition 50. The shaft 11 extends backwardly into the housing 49 and is journaled in the partition 50. Within the housing 49, the shaft 11 carries a gear wheel 51 meshing into a pinion 52 on a shaft 53 provided with a fly wheel 57, the shaft 53 being journaled in the housing 49 and in the partition 50. The shaft 53 is supplied with a pinion 54 meshing into a gear 55 on a shaft 58 that is journaled in the housing 49 and in the partition 50, the shaft 58 carrying a fly wheel 56 disposed externally of the housing 49.

Rotation is imparted to the shaft 11 by the spring 12, in the way hereinbefore described, and when the shaft 11 is rotated, rotation is passed along to the shaft 58, by way of the gear wheel 51, the pinion 52, the shaft 53, the pinion 54, and the gear 55. It will be understood that the shaft 58 is connected to the rear wheels of the vehicle, by the usual universal joint, differential and alike, these parts requiring no specific delineation or description, because they are common and thoroughly understood by those skilled in the art.

A means is provided whereby the speed of rotation of the shaft 58 may be regulated, and, having this consideration in mind, the shaft 53 extends through a brake mechanism 59 secured to the partition 50. The brake mechanism 59 includes a vertically movable plunger 60, the upper end of which is connected to a bell crank lever 61 fulcrumed on a standard 62 carried by the housing 49. A connection 63 is joined to the bell crank lever 61 and extends backwardly into easy reach of the operator of the vehicle.

By means of the connection 63 and the bell crank lever 62 the operator may raise or lower the plunger 60, thereby operating the brake mechanism 59 and controlling the speed of rotation of the shaft 58, the brake mechanism 59 acting upon the shaft 53 which is interposed between the shafts 11 and 58.

The transmission mechanism within the housing 49 includes means whereby the speed of rotation of the shaft 58 is governed automatically. Thus, a beveled gear 64 is secured to the shaft 53 and meshes with a beveled pinion 65 which is secured to a hollow shaft 66, the shaft 66 being journaled in a bearing 67 carried by the partition 50, the shaft 66 being journaled also in the upper part of the housing 49. The plunger 60 of the brake mechanism 59 is mounted for vertical reciprocation in the shaft 66. A governor 68 is connected to the hollow shaft 66, and, when the shaft 66 is rotated, the governor raises and lowers the plunger 66, thereby applying the brake mechanism 59 for easing it off. The shaft 66, obviously, derives its rotation from the shaft 53 by way of the beveled gear 64 and the beveled gear 65. The speed of rotation of the shaft 53 is regulated by the governor 68 and the brake mechanism 59, and the speed of rotation of the shaft 58 is similarly controlled, because the shafts 53 and 58 are connected by the gear members 54 and 55.

The operation of the device has been dealt with hereinbefore, in connection with its various component mechanisms, but a brief résumé will be given at this point.

By means of the shaft 17, the shaft 20, or the shaft 24, the spring barrel 10 may be rotated to wind up the spring 12. The spring 12, reacting, rotates the shaft 11. The transmission mechanism within the housing 49 carries the rotation to the shaft 58, and the shaft 58 applies the power to the rear wheels of the vehicle. The operator can control the speed of rotation of the shaft 58 by a train of parts beginning with the connection 63 and ending with the brake mechanism 59.

The brake mechanism 59, it will be recalled, is under the control of the governor 58.

What is claimed is:—

1. In a device of the class described, a vehicle having a ground wheel, a spring barrel supported for rotation on the vehicle, a driven shaft extended into the spring barrel, a torsion spring connected to the shaft and to the spring barrel, a gear rotatable on the spring barrel, a shaft supported for rotation, a worm rotatable on the shaft, a clutch connecting the worm with the shaft, means for connecting the shaft operatively with the ground wheel to wind up the spring, said means including a pawl and ratchet which permits the ground wheel to turn freely aback, a one-way clutch connecting the gear with the spring barrel, mechanism for rotating the spring barrel to wind up the spring, and means cooperating with the spring barrel to prevent retrograde rotation of the spring barrel.

2. In a device of the class described, a vehicle having a ground wheel, a spring barrel supported for rotation on the vehicle, a driven shaft extended into the spring barrel, a torsion spring connected to the shaft and to the spring barrel, a gear mounted on the spring barrel, a shaft supported for rotation, a worm rotatable on the shaft, a clutch connecting the worm with the said shaft, means for connecting the shaft operatively with the ground wheel to wind up the spring, said means including a pawl and ratchet which permits the ground wheel to turn freely aback, and mechanism for holding the spring barrel against retrograde rotation.

In testimony that we claim the foregoing as our own, we have hereto affixed our signatures.

JOHN W. EISIMINGER.
CHARLES H. ROBERTS.